United States Patent [19]

Brierley et al.

[11] Patent Number: 4,960,434

[45] Date of Patent: Oct. 2, 1990

[54] AZO DISPERSE DYE MIXTURE GIVING BRIGHT BLUE SHADES ON POLYESTER TEXTILES

[75] Inventors: David Brierley, Royton; Alan T. Leaver, Worsley, both of England

[73] Assignee: Imperial Chemical Industries plc, London, England

[21] Appl. No.: 363,331

[22] Filed: Jun. 7, 1989

Related U.S. Application Data

[63] Continuation of Ser. No. 219,778, Jul. 18, 1988, abandoned.

[30] Foreign Application Priority Data

Jul. 22, 1987 [GB] United Kingdom ............... 8717309

[51] Int. Cl.$^5$ .................... C09B 29/08; C09B 67/22; D06P 1/18; D06P 3/36
[52] U.S. Cl. ................................ 8/524; 8/532; 8/639; 8/696; 8/922
[58] Field of Search ..................... 8/524, 639

[56] References Cited

U.S. PATENT DOCUMENTS

| | | | |
|---|---|---|---|
| 3,342,804 | 9/1967 | Mueller | 8/524 |
| 3,398,135 | 8/1968 | Mueller | 8/693 |
| 3,398,137 | 8/1968 | Mueller | 534/849 |
| 4,537,597 | 8/1985 | Bergmann et al. | 8/639 |
| 4,678,476 | 7/1987 | Tappe et al. | 8/639 |
| 4,728,338 | 3/1988 | Henzi | 8/639 |

FOREIGN PATENT DOCUMENTS

1582743 1/1981 United Kingdom .

*Primary Examiner*—A. Lionel Clingman
*Attorney, Agent, or Firm*—Cushman, Darby & Cushman

[57] ABSTRACT

A dye composition suitable for the coloration of synthetic textile materials, especially linear polyester, by conventional disperse dyeing and printing processes comprising a mixture of a dye of the formula:

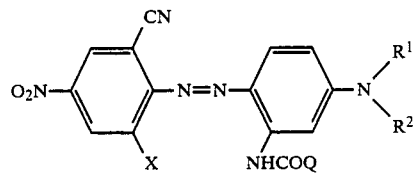

and a dye of the formula:

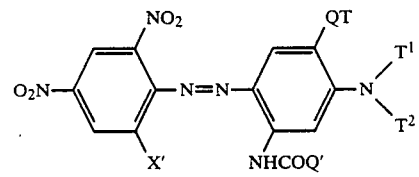

wherein
X and X' are each independently selected from Br, Cl and I;
Q and Q' are independently $C_{1-4}$-alkyl;
T is $C_{1-4}$-alkyl;
$R^1$ and $R^2$ are each independently $C_{1-4}$-alkyl or $C_{2-4}$-alkenyl; and
$T^1$ and $T^2$ are each independently $C_{1-4}$-alkyl or $C_{2-4}$-alkenyl.

7 Claims, No Drawings

AZO DISPERSE DYE MIXTURE GIVING BRIGHT BLUE SHADES ON POLYESTER TEXTILES

This is a continuation of application Ser. No. 07/219,778, filed July 18, 1988, which was abandoned upon the filing hereof.

This specification describes an invention relating to disperse dyes and more particularly to a composition of disperse dyes suitable for the coloration of polyester and polyester-cellulose unions.

According to the present invention there is provided a dye composition comprising an intimate mixture of a dye of the formula:

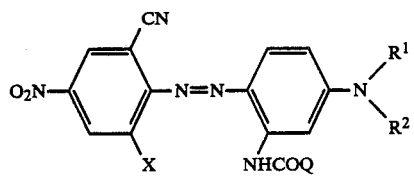

(hereinafter called Component I) and a dye of the formula:

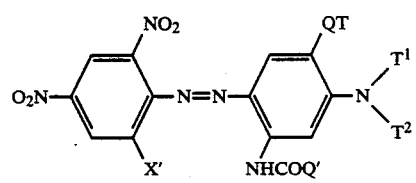

(hereinafter called Component II) wherein

X and X' are each independently selected from Br, Cl and I;

Q and Q' are each independently $C_{1-4}$-alkyl; T is $C_{1-4}$-alkyl;

$R^1$ and $R^2$ are each independently $C_{1-4}$-alkyl or $C_{2-4}$-alkenyl; and $T^1$ and $T^2$ are each independently $C_{1-4}$-alkyl or $C_{2-4}$-alkenyl.

A particularly useful mixture is achieved when X and X' are Br and thus it is preferred that both X and X' are bromine.

Although the precise definitions of the other variables in both components are not critical; it is generally preferred that Q, Q' and T are ethyl or, more especially, methyl.

It is preferred that $R^1$, $R^2$, $T^1$ and $T^2$ are each ethyl. Examples of other groups represented by $R^1$, $R^2$, $T^1$ and $T^2$ are methyl, n-propyl, iso-propyl, n-butyl and allyl.

An especially preferred composition in accordance with the present invention is a two component mixture of the dyes:

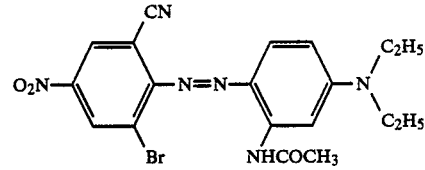

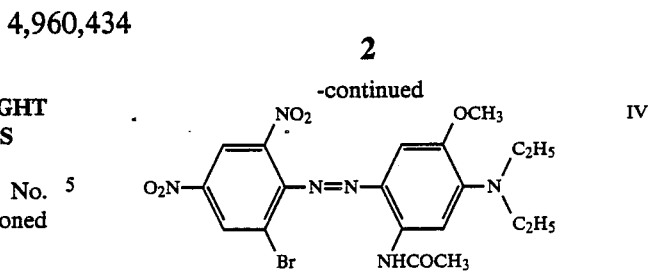

hereinafter referred to as Components III and IV respectively.

Each of Component I and Component II is preferably a single dye but either may comprise a mixture of dyes of the respective formula. The relative proportions of Component I to Component II in the mixture is preferably from 95:5 to 50:50 and more preferably from 90:10 to 70:30. An especially advantageous mixture comprises from 80–85% of Component I, and more especially of Component III, and from 20–15% of Component II, and more especially of Component IV.

Other preferred compositions in accordance with the present invention are a two-component mixture of the dyes:

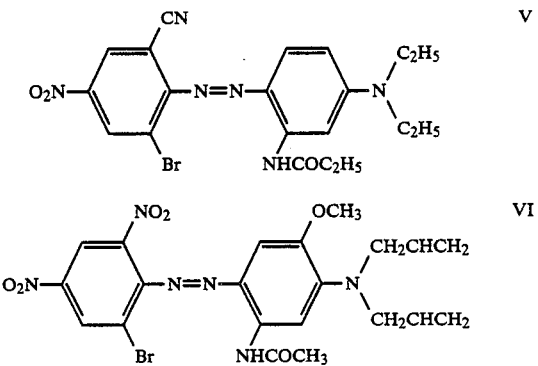

hereinafter referred to as Components V and VI respectively, and mixtures of Component V with Component IV and Component III with Component VI. Further preferred compositions can be obtained by mixing a dye of the formula:

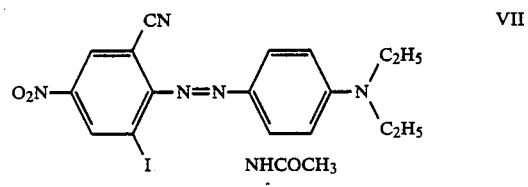

hereinafter referred to as Component VII with Component III or Component VI.

The composition is conveniently prepared by physical admixture of Component I and Component II, preferably before they are dispersed and formulated. The composition may be formulated as a liquid, suitable for continuous dyeing and printing applications, with dispersing agents, stabilisers and humectants, or as a solid product, suitable for high temperature (exhaust) dyeing applications, with dispersing agents suitable for this application. The individual components of the composition may be prepared in a conventional manner by diazotisation of an amine of the formula:

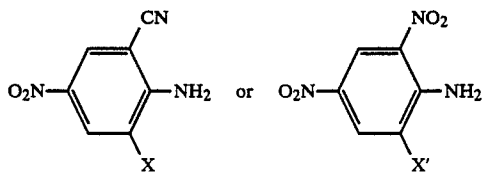

and coupling with a coupling component of the formula:

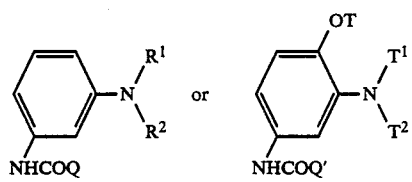

under appropriate conditions.

The present composition, consisting of Component I and Component II alone, provides bright blue shades on polyester and polyester union materials which have generally superior properties in comparison with the individual components and other commercially available dyes having a similar shade to the composition.

Component I has a bright, reddish-blue shade on polyester materials when viewed in normal daylight but exhibits a red "flare" in tungsten light. The distinction between the shades of Component I in daylight and tungsten is a serious disadvantage of this dye which has restrained its commercial acceptance. In contrast the present composition has virtually identical shades in day- and tungsten-light and also has a slightly greener shade than Component I which is preferred by commercial dyers.

Component II has a dull greenish-blue shade, is not widely used as a self shade and is certainly not suitable alone for the generation of bright blue shades.

The composition of Components I and II, and especially that containing 80–85% of Component III and 20–15% of Component IV, has a similar shade to that of the anthraquinone dye, CI Disperse Blue 56, although, being an azo dye, it is considerably cheaper to prepare, especially on a commercial scale. In addition, the present composition is tinctorially much stronger than Blue 56 as well as having a superior build-up on polyester and polyester unions. Other advantages of the present composition over Blue 56 are higher wet fastness, which is important because machine washing is superseding dry-cleaning in the cleaning of garments made from polyester and polyester unions, and higher heat fastness, which is important because of the requirement for heat setting and other processes involving the use of high temperatures in the finishing of polyester textile materials and garments made from these.

The composition may contain dyes of other formulae, particularly of yellow, red and brown shades, especially in order to provide navy and black shades.

The present invention is further illustrated by the following Examples in which all parts and percentages are by weight unless otherwise indicated.

EXAMPLE 1

A composition of 15.9 parts of Component III and 3.55 parts of Component IV was prepared by mixing the two dyes together and milling the mixture as a 40% aqueous slurry with 10 parts of a temperature-stable dispersing agent until the mean diameter of the dye particles was in the range 0.1–5 microns.

EXAMPLE 2

The dispersion of Example 1 was standardised to a liquid brand containing 20% of the dye composition, by the addition of 7.5 parts of a humectant and water. This product is especially suitable for use in the printing and continuous dyeing of polyester and polyester-cotton blends but can also be used for exhaust dyeing.

EXAMPLE 3

The dispersion of Example 1 was standardised to a solid brand containing 20% dye and 80% dispersing agent, by the addition of 70 parts of a temperature-stable dispersing agent and drying to a grain form in a spray drier. This product is especially suitable for the exhaust dyeing of polyester, polyester-cotton and polyester-wool blends.

EXAMPLE 4

A dyebath for the exhaust dyeing of polyester in piece form was prepared by adding 2 mls of an aqueous dispersion of the product of Example 3 (2g dye in 100 ml water at 40°–50° C.) to a dyebath of a high temperature dyeing machine (Graham-Jamin) containing 57.4 ml of de-ionised water and 0.6 ml of buffer. A 5 g piece of polyester fabric was held in the dyebath for 45 minutes at 130° C. After rinsing with water and a reduction clear treatment, the dyed material was virtually identical in hue to the same polyester fabric dyed by the same process with CI Disperse Blue 56, though slightly duller in shade.

Further compositions in accordance with the present invention may be prepared by mixing and milling the number of parts of the components set out in Table 1 using the process, dispersing agent and humectant described in Example 1 to 3.

TABLE 1

| Ex | First Component | Second Component | Dispersing Agent | Humectant | Process |
|---|---|---|---|---|---|
| 5 | Comp V 11.9 | Comp IV 2.7 | 8.0 | | Ex 1 |
| 6 | | | | 5.6 | Ex 2 |
| 7 | | | 52.8 | | Ex 3 |
| 8 | Comp III 13.8 | Comp VI 3.1 | 8.7 | | Ex 1 |
| 9 | | | | 6.5 | Ex 2 |
| 10 | | | 11.0 | | Ex 3 |
| 11 | Comp V 20.8 | Comp VI 4.6 | 13.1 | | Ex 1 |
| 12 | | | | 9.8 | Ex 2 |
| 13 | | | 91.5 | | Ex 3 |
| 14 | Comp VII 11.4 | Comp IV 2.4 | 6.5 | | Ex 1 |
| 15 | | | | 4.9 | Ex 2 |
| 16 | | | 45.8 | | Ex 3 |
| 17 | Comp VII 14.8 | Comp VI 3.1 | 8.5 | | Ex 1 |
| 18 | | | | 6.4 | Ex 2 |
| 19 | | | 59.5 | | Ex 3 |

The dispersion of Examples 7, 10, 13, 16 and 19 can be used in the exhaust dyeing process of Example 4 in place of the dispersion of Example 3 to give a dyed material of similar hue.

We claim:

1. A dye composition comprising an intimate mixture of a dye of the formula:

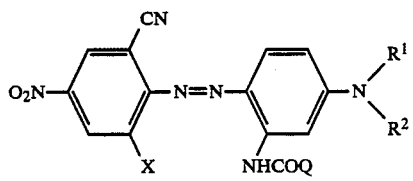

and a dye of the formula:

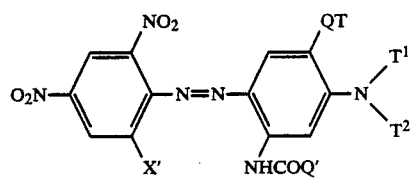

(hereinafter called Component II) wherein
  X and X' are each independently selected from Br, Cl and I;
  Q and Q' are each independently $C_{1-4}$-alkyl; T is $C_{1-4}$-alkyl;
  $R^1$ and $R^2$ are each independently $C_{1-4}$-alkyl or $C_{2-4}$-alkenyl; and
  $T^1$ and $T^2$ are each independently $C_{10-4}$-alkyl or $C_{2-4}$-alkenyl
  where said composition contains from 80–85% of the dye of formula I and 20–15% of the dye of Formula II.

2. A composition according to claim 1 in which
  X and X' are bromine;
  Q, Q' and T are each independently methyl or ethyl; and $R^1$, $R^2$, $T^1$ and $T^2$ are each independently selected from methyl, ethyl, n-propyl, iso-propyl, n-butyl and allyl.

3. A composition according to claim 1 consisting of mixture of the dyes:

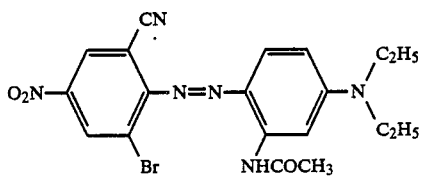

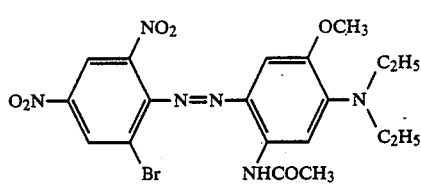

4. A composition according to claim 1, claim 2 or claim 3 containing from 80–85% of the dye of Formula I or Formula III and 20–15% of the dye of Formula II or Formula IV.

5. A dye composition suitable for the production of navy or black shades on polyester comprising a mixture of a composition according to any one of claims 1 to 4 with a yellow, red or brown disperse dye.

6. A process for the coloration of polyester or polyester union textile material which comprises dyeing the material in a disperse dye bath at a temperature of 90°–140° C. with a finely-divided aqueous dispersion of a composition according to any one of claims 1 to 5.

7. A process for the coloration of polyester of polyester union textile material which comprises applying a finely divided dispersion or print paste of a composition according to any one of claims 1 to 5 and exposing the material to a dry or steam heat treatment at a temperature of 150°–250° C.

* * * * *